United States Patent [19]

Johannsen et al.

[11] Patent Number: 5,363,087
[45] Date of Patent: Nov. 8, 1994

[54] APPARATUS FOR PROVIDING A REGENERANT SOLUTION TO A REGENERABLE LIQUID TREATMENT MEDIUM BED

[75] Inventors: James Johannsen, Minnetonka; Ralph A. Larson, Bayport; Jeffrey A. Zimmerman, Blaine, all of Minn.

[73] Assignee: Ecowater Systems, Inc., Woodbury, Minn.

[21] Appl. No.: 94,282

[22] Filed: Jul. 20, 1993

[51] Int. Cl.$^5$ ............................................... G08B 21/00
[52] U.S. Cl. .................................. 340/612; 340/617; 210/85
[58] Field of Search ........................ 340/612, 617, 618; 210/91, 190, 85

[56] References Cited

U.S. PATENT DOCUMENTS

| | | |
|---|---|---|
| 2,955,466 | 11/1960 | Coles . |
| 3,102,175 | 8/1963 | Eichenberger, Jr. ............ 340/617 X |
| 3,697,708 | 10/1972 | Beresic ................. 200/61.21 |
| 3,706,980 | 12/1972 | Maltby . |
| 3,783,689 | 1/1974 | Ehrenfried et al. . |
| 4,987,409 | 1/1991 | Jackson . |
| 5,132,669 | 7/1992 | Jackson . |
| 5,147,531 | 9/1992 | Dougal ................................ 210/91 |
| 5,239,285 | 8/1993 | Rak ................... 340/612 X |

Primary Examiner—Jeffery A. Hofsass
Attorney, Agent, or Firm—Jon Carl Gealow; James M. Wetzel

[57] ABSTRACT

A liquid treatment apparatus or system having a liquid treatment medium bed which is regenerated by passing through it a solution formed by dissolving a solid in a liquid. An automatic control system initiates a regeneration cycle when necessary. Indicia are provided in association with the container containing the solid material such that an appropriate indicia will represent the amount of solid material in the container. By providing the control circuit with the indicia, the control circuit will record the amount of solid material remaining and initiate an alarm when the amount of solid material remaining is below a predetermined level.

8 Claims, 3 Drawing Sheets

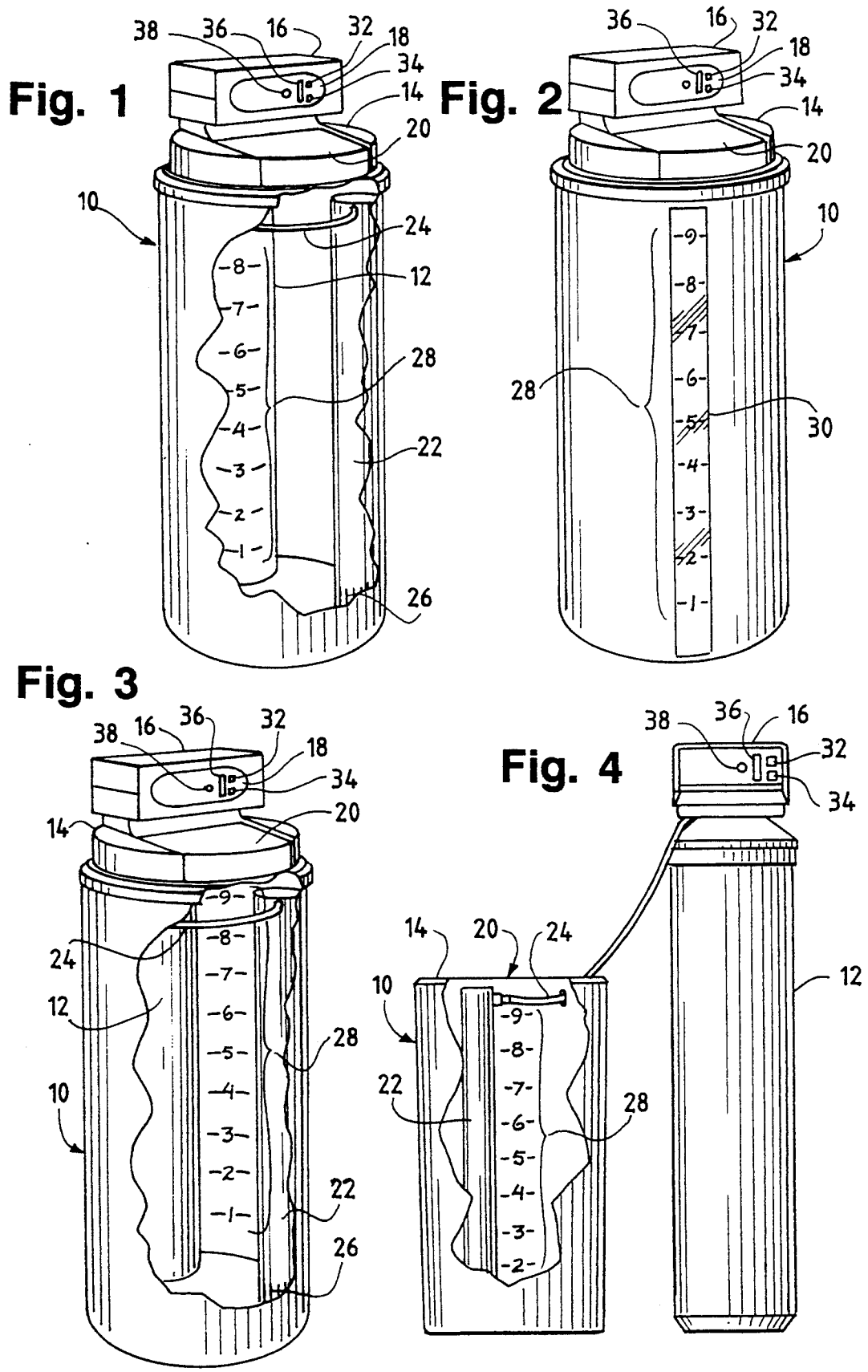

APPARATUS FOR PROVIDING A REGENERANT SOLUTION TO A REGENERABLE LIQUID TREATMENT MEDIUM BED

BACKGROUND OF THE INVENTION

1. Field of the Invention

This invention relates to a liquid treatment apparatus or system wherein a liquid treatment media bed is regenerated with a solution formed by dissolving a solid material in a liquid. More particularly, it relates to apparatus for monitoring the amount of solid material available for forming the solution.

2. Background of the Invention

Some liquid treatment systems have a liquid treatment medium bed which is regenerated by passing a solution formed by dissolving a solid in a liquid through the bed. In the use of such systems, it is desirable to make those persons responsible for proper operation of the system aware of the need to replenish the solid material before it is totally exhausted. Liquid treatment system having a control system which provides for automatic regeneration of a liquid treatment medium, may initiate a regeneration cycle even though the solid, which is dissolved to form the regenerant solution, has been exhausted. The solid material having been exhausted, the flow of untreated liquid during the several cycles of a regeneration will cause even further depletion of the liquid treatment medium bed.

One of the most common liquid treatment systems of this type is the domestic water softener which removes hardness from raw water by passing it through a tank containing a liquid treatment medium bed, typically formed of resin beads. A salt solution, that is brine, is passed through the resin bed to restore its softening capacity. The brine is formed in a container which is connected by a liquid flow passage to the tank containing the resin beads. The flow of liquid through the liquid flow passage is regulated by a control valve which is actuated by an electronic regeneration control circuit.

Salt, typically in the form of chunks or pellets, is placed in the container. Under the control of the electronic regeneration control circuit, the control valve allows a predetermined amount of water to enter the container. Providing enough salt is present, the water and salt form a saturated salt solution, or brine, which is the regenerant for the resin bed. Again, under the control of the electronic regeneration control circuit, the control valve is actuated to cause the brine to be withdrawn from the container and circulated through, and thereby regenerate, the resin in the tank.

The amount of salt remaining in the container is reduced each time a portion of the salt is dissolved to form a regenerant. The supply of salt will become exhausted after a number of regeneration cycles, unless additional salt is placed in the container. Such that the salt supply will not become exhausted, it is desirable to provide some type of alarm to indicate that the salt supply is close to being exhausted. Such an alarm may be formed as a part of the electronic regeneration control circuit.

While such systems have been provided in the past, various shortcomings in the design and operation of such systems have been observed. For instance, U.S. Pat. No. 4,987,409 —Jackson, entitled: LEVEL SENSOR AND ALARM is directed towards a system wherein a sensor, in the form of a position responsive switch, is placed in a salt brine tank. As set forth in the Jackson patent, the sensor 52 includes a mercury switch 68, the contacts of which are open as long as the sensor is resting on salt. The sensor is weighted such that the contacts close when the salt level is reduced to a level such that the sensor 52 floats on the liquid in the tank. The level sensor disclosed in the Jackson patent, and others which place an electronically conductive sensor in the brine tank, are subject to the very corrosive atmosphere which exists within the brine tank.

It is well known that a salt-brine laden atmosphere is very corrosive by nature. Placed in such an atmosphere, any electrical device, which necessarily includes metal conductors, is subject to corrosion which ultimately will result in the failure of the device. Further, mercury being considered a hazardous material, it is undesirable to locate a switch, such as shown in the Jackson patent, in a brine tank. Should mercury escape from the switch, it will come in contact with water potentially to be consumed by humans.

SUMMARY OF THE INVENTION

Accordingly, it is an object of this invention to provide an apparatus for providing a regenerant solution to regenerable liquid treatment medium bed, which apparatus includes an alarm means to signal the need to add a solid material, used to form the regenerant solution, to the container in which the regenerant solution is produced. It is an object of this invention that the alarm be responsive to an electronically stored indication of the amount of the solid material available for providing a regenerant solution. It is a further object of this invention that the amount of solid material actually available in the container be provided to the electronic control circuit without the need for the presence of any type of electrical device in the container in which the regenerant solution is produced.

It is another object of this invention to provide indicia for use in visually observing and manually inputting to the electronic regeneration control means the available quantity of solid material. The electronically stored indication of quantity being reduced by a predetermined amount each time the liquid treatment medium bed is regenerated.

It is a still further object of this invention that the electronic circuit which electronically stores an indication of the amount of solid material available for creating regenerant solution include recalibration means, such that the reduction in the amount of solid material available each time the liquid treatment bed is regenerated is adjusted to be responsive to conditions of the particular system with which the electronic regeneration control means is associated.

In accordance with one embodiment of this invention, an apparatus for providing a regeneration solution to a regenerable liquid treatment medium bed includes an electronic regeneration control circuit for controlling the regeneration of a liquid treatment medium bed with regenerant solution formed in a container by dissolving a quantity of solid material in a liquid. The container in which the regenerant solution is formed is provided with indicia spaced apart in a vertical direction. The indicia are observable with respect to the top surface of the quantity of solid material received in the container. An electronic control circuit includes a manual input means for entering the amount of solid material available in the container in terms of the observed indicia most closely corresponding to the top surface of the solid material. The electronic control circuit includes means for electronically reducing, each time a quantity of regenerant solution is used to regenerate the liquid treatment medium, the electronically stored indication of the amount of solid material remaining in the container. The apparatus includes an alarm means which is actuated to provide an alarm when the electronically stored indication of the amount of solid material remaining in the container is less than a predetermined minimum amount.

BRIEF DESCRIPTION OF THE DRAWINGS

FIG. 1 is a perspective view of a water softener with a brine tank and an electronic control in accordance with one embodiment of this invention, with a portion of the brine tank being broken away.

FIG. 2 is a perspective view of a water softener with a brine tank and an electronic control in accordance with another embodiment of this invention.

FIG. 3 is a perspective view of a water softener with a brine tank and an electronic control in accordance with still another embodiment of this invention, with a portion of the brine tank being broken away.

FIG. 4 is a perspective view of a water softener with a brine tank and an electronic control in accordance with still another embodiment of this invention, with a portion of the brine tank being broken away.

DETAILED DESCRIPTION OF THE PREFERRED EMBODIMENT

Figure 5:
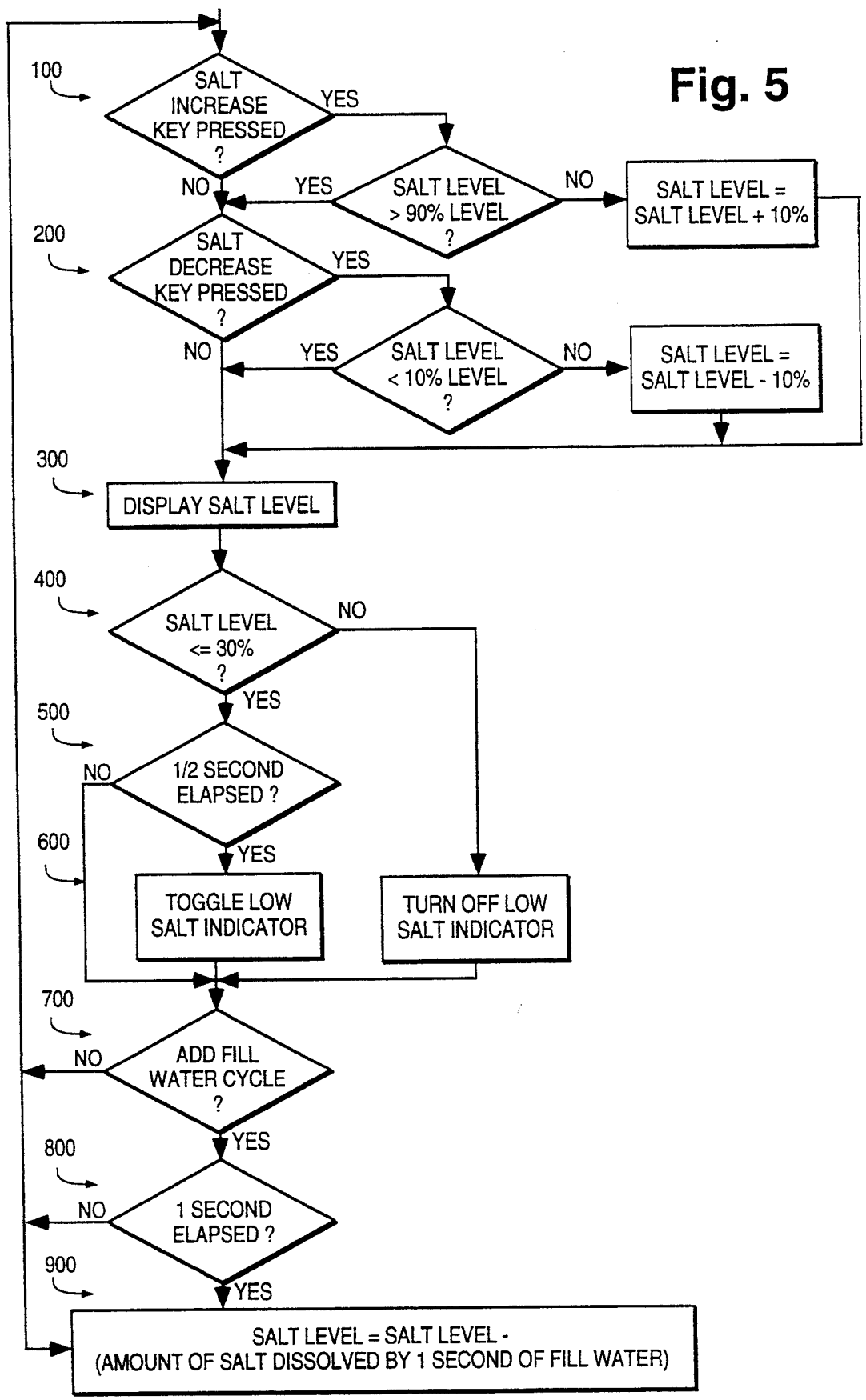
FIG. 5 is a salt monitor flow chart setting forth the operation of an electronic regeneration control circuit for a water softener system in accordance with a preferred embodiment of this invention.

Referring to FIG. 1, this invention will be described as embodied in a water softener wherein the water softening system includes a salt container or tank 10 within which is located a resin tank 12. The salt storage container 10 is provided with a cover 14 which supports a housing 16 enclosing an electronic regeneration control circuit. The front face of the electronic control circuit housing 16 is provided with display and control panel 18. The cover 14 includes a removable lid 20 which is provided primarily for the purpose of permitting salt to be placed in the salt storage container 10. The salt storage container 10 and the electronic control circuit are appropriately connected by a tube and electrical conductors to the resin tank and an electronically operated control valve respectively.

A brine well 22 is placed within the salt storage container 10. Placed within the brine well is a conduit (not shown) which extends to near the bottom of the salt storage container. A tube 24 connects the conduit to the appropriate connection on the control valve. Openings 26 are provided at the bottom of the brine well such that water may flow out of the brine well and brine into the brine well. However, the opening are sized such that solid particles, particularly salt, are prevented from entering the brine tank.

Under the control of the electronic control circuit, the control valve permits a predetermined amount of water to flow through the tube 24, conduit, and openings 26 in the brine well 22 into the brine tank. The flow of water into the brine well 22 may also be terminated by a float valve associated with the conduit and located in the brine well. As demanded by the electronic control circuit, the control valve is actuated to withdraw brine from the brine tank through the openings 26 in the brine well 22, the conduit and the tube 24 by a venturi pumping action.

In accordance with the embodiment of this invention shown in FIG. 1, indicia 8 are provided in association with the brine tank or container in such a manner as to be readily observable with respect to the top surface of the salt in the tank by removing the lid 20. As shown in FIG. 1, the indicia 28 are integrally formed on the sidewall of the resin tank 12, which is located within the salt storage container 10, in such a position as to be readily visible when the lid 20 is removed. The indicia 28 could, of course, be provided on the sidewall of the resin tank 12 in other ways, such as by providing a separately formed measurement strip similar to a ruler or yardstick, having the indicia 28 formed thereon, which strip is secured to the sidewall of the resin tank 12. While the indicia may be provided in many different ways, they should, of course, be provided in a form which is not attacked by the corrosive atmosphere resulting from the brine contained within the tank. In the preferred embodiment of this invention, the indicia 28 are spaced apart in a vertical direction such that the space between adjacent indicia 1 through 9 represents one-tenth of the total salt capacity of the tank.

Referring to FIG. 2, another embodiment of a water softening system of this invention is shown in which the salt storage container 10 is provided with a transparent or semi-transparent window 30 having the indicia 28 formed thereon. In the embodiment shown in FIG. 2, similar components are identified by numerals corresponding to those applied to the embodiment shown in FIG. 1. In this embodiment the indicia 28 are readily visible on the outside of the storage tank, as is the salt level through the transparent window 30, such that it is not necessary to remove the lid 20 to observe the salt level and the indicia 28. While this embodiment may be more convenient to use, it adds considerably to the cost of the salt container 10.

FIG. 3 shows still another embodiment of this invention wherein the indicia 28 are integrally formed on the inside surface of the brine tank 10, much as they were on the resin tank 12 in FIG. 1. Again, the indicia could be provided on a separately formed measurement strip similar to a ruler or yardstick, having the indicia formed thereon, which is secured to the inside wall of the salt container 10 in a position to be readily observed when the lid 20 is removed.

This invention is also applicable to softeners in which the salt container 10 is separated from the resin tank 12. Such a softener is shown in FIG. 4. As shown in FIG. 4, the indicia are integrally formed on the inside surface of the brine tank, much as they are in the embodiment shown in FIG. 3. However, they could also be provided as shown in FIG. 2.

Provided on the control panel of the softener systems shown in FIGS. 1–4 are manual input means for inputting salt levels as observed with respect to the indicia 28. Referring to FIGS. 1 through 4, the control manual input means includes a salt increase key 32, a salt decrease key 34, a salt level display 36, shown as a bar indicator, and an alarm indicator 38, such as lighted indicator.

The operation of a water softener in accordance with this invention will now be described by making reference to the flow chart set forth in FIG. 5. Presuming that a quantity of salt has just been added to the salt tank 10, the indicia 28 which closest to the top surface of the salt should be identified. The identified indicia may be the one that is just visible above the top surface of the salt, or it may be the one just below the top surface of the salt. Whichever indicia 28 is considered to be most appropriate is entered into the electronic control circuit by actuating either the salt increase key 32 or the salt decrease key 34 until the salt level display 36, indicates a salt level corresponds to the salt level observed in the salt tank 10.

For instance, if after the addition of salt, the top level of the salt is closest to the indicia indicating that the tank is 80% full, the appropriate salt increase key 32 or salt decrease key 34 is actuated until the salt level display 36 shows 80%. As set forth at 100 on the flow chart, if the salt increase key 32 is pressed when the currently stored salt level is not greater than 90%, the stored or displayed salt level will be increased by 10%. If the currently displayed salt level is greater than 90%, the displayed and stored salt level is not changed.

When the salt level is again observed after a period of use, and the salt level display 36 indicates a greater or lesser amount of salt than that indicated by the observed indicia 28, the salt increase key 32 or the salt decrease key 34 should be actuated to correct the salt level stored by the electronic control circuit.

The functioning of the salt increase key 32 as set forth at 100 in the flowchart has been described. As set forth at 200 in the flowchart, if the salt decrease key 34 is pressed when the salt level is not less than 10%, the stored or displayed salt level will be decreased by 10%. If the currently displayed salt level is less than 10% the displayed and stored salt level is not changed.

The electronic control circuit is designed to actuate the alarm or low salt indicator 38 at a predetermined minimum salt level. For instance, the predetermined minimum salt level may be set at 30% as shown at 400 in the flowchart. If the predetermined minimum salt level is set at 30%, and if the salt level is equal to or less than 30% for more than one-half second, the low salt indicator will be energized as indicated at 500 and 600 in the flowchart. The low salt level indicator will be turned off if the salt level is greater than 30% as indicated at 400 in the flowchart.

After brine has been used to regenerate the resin bed, water will be added to the salt tank 10 at an appropriate time and in an appropriate amount as controlled by the electronic control circuit actuating the control valve, or by a float valve as previously discussed. As set forth in the flow chart at 700, if fill water is not added to the salt tank, the displayed salt level will remain at its current level. However, if fill water is being added to the salt tank and more than one second has elapsed, as set forth at 800 in the flow chart, the stored salt level will be decreased by the amount of salt which will dissolve in the amount of fill water which enters the salt tank in one second as set forth at 900 in the flowchart. When fill water has been added, and brine used over a period of time, presumably several regeneration cycles, such that the displayed and stored salt level is reduced to 30% or less, 400 on the flow chart, and more than one-half second has elapsed, 500 on the flow chart, the low salt indicator 38 will be actuated. While a low salt visible or illuminated indicator is shown on the control panel, an audible indicator may also be actuated.

After salt has been added to the salt tank 10, and the actual salt level is entered into the electronic control circuit by the increase or decrease keys, and brine has been used for a period of time, that is several regeneration cycles, the salt level display 36 may indicate a different salt level than that observed by the indicia 28. If such is the case, the increase or decrease keys may be used to enter the observed salt level in a recalibration mode whereby the decrease in salt level set forth at 900 in the flowchart will be corrected to correspond with actual amount dissolved. The electronic regeneration control circuit includes a recalibration circuit for recalibrating the circuit which reduces the electronically stored indication of the amount of solid material available. The recalibration circuit compares the electronically reduced stored indication of the amount of solid material available with the actual amount of solid material available as entered by a manual input of the observed indicia most closely corresponding to the top surface of the remaining quantity of pieces of solid material. From this comparison, the recalibration circuit creates a correction factor which is subsequently used in determining the electronically stored indication of the reduced amount of solid material available.

Figure 6:
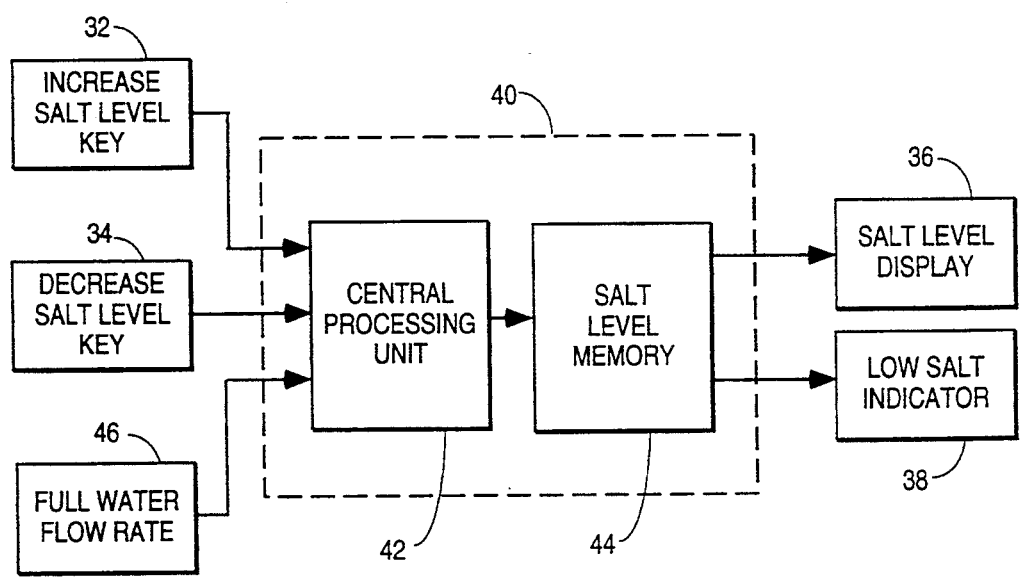
FIG. 6 is a block diagram of a portion of an electronic regeneration control circuit in accordance with a preferred embodiment of this invention.

Referring to FIG. 6, a portion of an electronic regeneration control circuit in accordance with this invention is shown. A microcomputer 40 includes a central processing unit 42 and a salt level memory 44. Inputs to the central processing unit include the salt increase key 32, the salt decrease key 34, and fill water flow time 46. Outputs of the central processing unit 42 as based on the information stored in the salt level memory 44 are the salt level display 36 and the low salt indicator 38. The operation of the circuit shown in FIG. 6 is in accordance with the flow chart of FIG. 5. It should be understood that only those aspects of the electronic regeneration control circuit directly relating to this invention are shown in FIG. 6. The microcomputer 40 also has other inputs, such as time of day, usage of processed water, etc. and also additional outputs such as those controlling the control valve.

It should be apparent to those skilled in the art that what has been described is considered at present to be a preferred embodiment of the apparatus for providing a regenerant solution to a regenerable liquid treatment medium bed. However, in accordance with the patent statutes, changes may be made in the apparatus without actually departing from the true spirit and scope of this invention. The appended claims are intended to cover all such changes and modifications which fall within the true spirit and scope of this invention.

We claim:

1. An apparatus for providing a regeneration solution to a regenerable liquid treatment medium bed, said apparatus comprising:

an electronic regeneration control circuit for controlling the regeneration of said regenerable liquid treatment medium bed, a container in which to make regeneration solution, said container having a bottom and sidewalls, a quantity of pieces of a solid material used to form a regenerate solution when dissolved in a predetermined quantity of a liquid received in said container, said quantity of pieces of solid material having a top surface, indicia associated with said container, said indicia being spaced apart in the vertical direction, said indicia being observable with respect to said top surface of the quantity of pieces of said solid material received in said container, said electronic control circuit including manual input means for entering the observed indicia most closely corresponding to said top surface of said quantity of pieces of solid material, so as to store in said electronic control circuit an indication of the amount of said material available for creating regeneration solution, said electronic control circuit including means for reducing said electronically stored indication of the amount of solid material available for creating regeneration solution each time a quantity of said regenerate solution is used to regenerate said liquid treatment medium bed, alarm means responsive to said electronically stored indication of the amount of solid material available for creating regeneration solution to provide an alarm when based on said observed top surface of the quantity of pieces of said solid material, and usage, less than a predetermined amount of solid material remains in said container.

2. The apparatus of claim 1, wherein said alarm is terminated when an observed indicia most closely corresponding to said top surface of said quantity of pieces of solid material is entered by said manual input means which is greater than said predetermined amount of solid material.

3. The apparatus of claim 1, wherein said indicia are spaced apart such that the spaces between adjacent indicia are representative of the same amount of solid material.

4. The apparatus of claim 3, wherein the spaces between adjacent indicia are each representative of ten percent of the capacity of said container for said material.

5. The apparatus of claim 1, wherein said indicia are provided on said sidewall of said container.

6. The apparatus of claim 1, wherein said electronic control circuit includes recalibrating means for recalibrating said means for reducing said electronically stored indication of the amount of solid material available, said recalibrating means comparing said electronically reduced stored indication of the amount of solid material available with the actual amount of solid material available as entered in said manual input means as the observed indicia most closely corresponding to said top surface of said quantity of pieces of solid material, and creating a correction factor to be subsequently used in reducing said electronically stored indication of the amount of solid material available.

7. The apparatus of claim 1, wherein said electronic control circuit includes a visually observable display means for indicating the quantity of pieces of said solid material in said container as stored in said electronic control circuit.

8. The apparatus of claim 1, wherein said medium bed is formed of an ion exchange resin and said solid material is sodium chloride.

* * * * *